(12) United States Patent
Weres (10) Patent No.: US 8,276,381 B2
(45) Date of Patent: Oct. 2, 2012

(54) RETURN CARBON DIOXIDE TO FLASHED GEOTHERMAL BRINE TO CONTROL SCALE DEPOSITION IN A GEOTHERMAL POWER PLANT

(75) Inventor: Oleh Weres, Gardnerville, NV (US)

(73) Assignee: ChemTreat, Inc., Glen Allen, VA (US)

( * ) Notice: Subject to any disclaimer, the term of this patent is extended or adjusted under 35 U.S.C. 154(b) by 0 days.

(21) Appl. No.: 13/109,886

(22) Filed: May 17, 2011

(65) Prior Publication Data

US 2011/0219769 A1    Sep. 15, 2011

Related U.S. Application Data

(60) Provisional application No. 61/425,154, filed on Dec. 20, 2010.

(51) Int. Cl.
*F01K 27/00* (2006.01)
*F03G 7/00* (2006.01)

(52) U.S. Cl. .................. 60/641.5; 60/641.1; 60/641.2
(58) Field of Classification Search .............. 60/641.2, 60/641.3, 641.1, 641.5
See application file for complete search history.

(56) References Cited

U.S. PATENT DOCUMENTS

| | | | |
|---|---|---|---|
| 4,428,200 A | 1/1984 | McCabe et al. | |
| 4,537,684 A | 8/1985 | Gallup et al. | |
| 5,020,328 A * | 6/1991 | Bronicki | 60/641.5 |
| 5,085,782 A | 2/1992 | Gallup et al. | |
| 5,400,598 A * | 3/1995 | Moritz et al. | 60/641.2 |
| 5,598,706 A | 2/1997 | Bronicki et al. | |
| 5,816,048 A * | 10/1998 | Bronicki et al. | 60/641.5 |
| 7,775,045 B2 * | 8/2010 | Kaplan et al. | 60/641.2 |

OTHER PUBLICATIONS

Applicant's Rule 1.501 submission titled "Description of Prior Art Power Plant Configuration".

* cited by examiner

*Primary Examiner* — Thomas Denion
*Assistant Examiner* — Christopher Jetton
(74) *Attorney, Agent, or Firm* — Oleh Weres (57) ABSTRACT

Geothermal brine always contains some carbon dioxide in solution. Separating steam from geothermal brine removes the carbon dioxide, sharply increasing the pH of the brine and causing precipitation of pH sensitive minerals, including calcium carbonate, magnesium silicate and other metal silicates, clays, and metal sulfides. The binary heat exchanger in a steam-binary hybrid geothermal power plant is especially sensitive to scale deposition from flashed geothermal brine, and application of expensive scale inhibitors is required. Deposition of scale in the binary heat exchanger can be controlled by separating a small amount of gas-rich vapor from the brine before the main stage of steam separation, and combining this gas rich vapor with the flashed brine before in enters the binary heat exchanger. The carbon dioxide thus added to the brine will decrease pH, decreasing or completely blocking precipitation and deposition of pH sensitive minerals as scale.

18 Claims, 4 Drawing Sheets

RETURN CARBON DIOXIDE TO FLASHED GEOTHERMAL BRINE TO CONTROL SCALE DEPOSITION IN A GEOTHERMAL POWER PLANT

RELATED PATENT APPLICATIONS

Priority is claimed of Provisional Patent Application 61/425,154 filed 20 Dec. 2010.

FIELD OF INVENTION

A method and power plant improvements are provided which allow deposition of scale from flashed geothermal brine to be controlled at small cost, thereby eliminating operational problems while decreasing the need for costly treatment chemicals.

BACKGROUND

While in the geothermal reservoir underground, geothermal brine is in chemical equilibrium with most of the minerals present in the reservoir rock, and chemical constituents of these minerals are dissolved in the brine.

When steam is separated from produced geothermal brine, the temperature drops, and pH increases. The solubility of several minerals commonly precipitating from geothermal brine or depositing as scale is highly sensitive to brine pH; these include calcite (calcium carbonate) and other carbonates, magnesium silicates, calcium silicates, clay minerals, and the sulfides of zinc, iron and lead. Scale deposits must be controlled to avoid serious operational problems.

Figure 1:
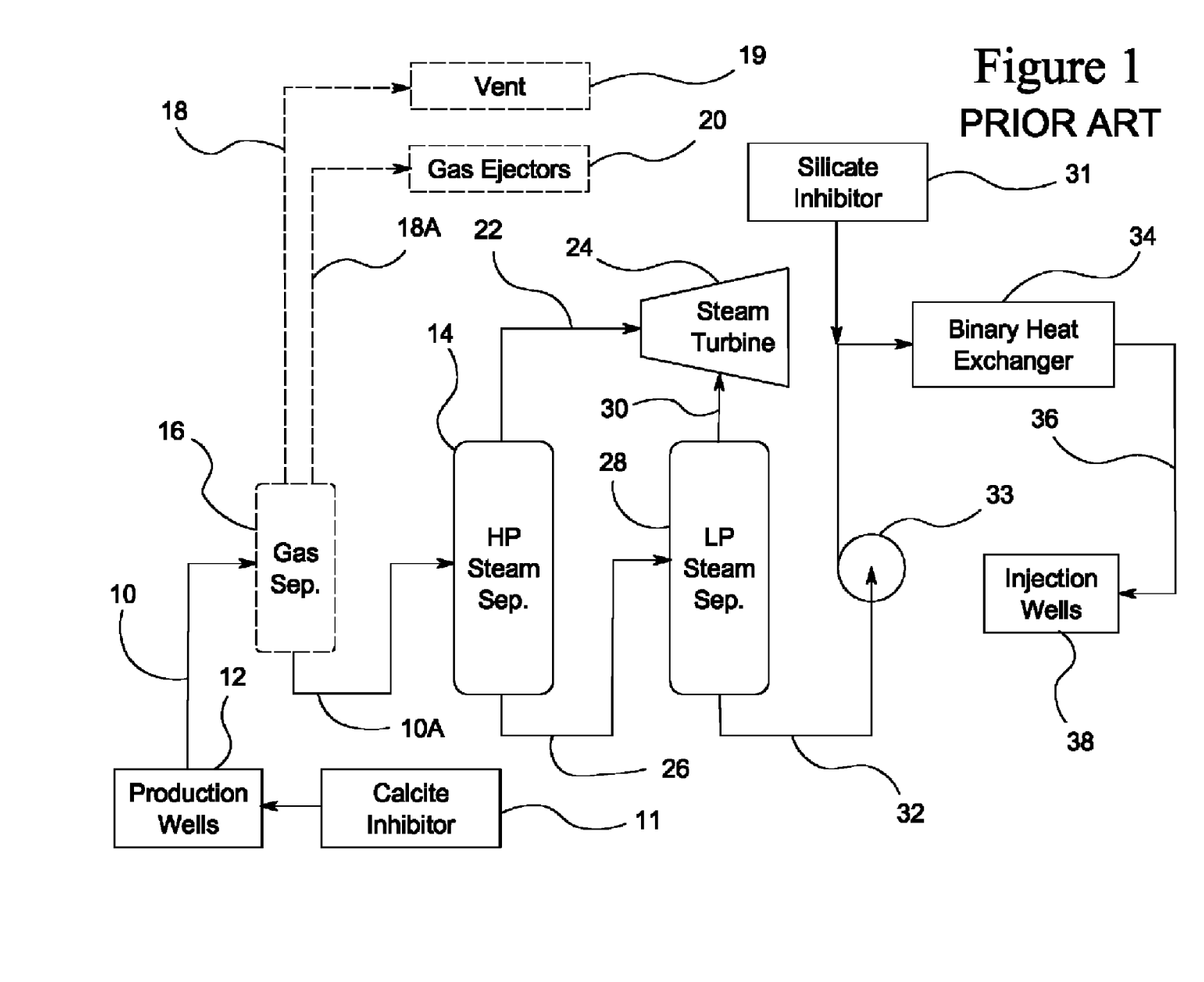
FIG. 1 illustrates prior art in simplified, schematic form: a typical steam-binary hybrid geothermal power plant.

FIG. 1 illustrates relevant parts of a geothermal power generating system known in the prior art as a "steam-binary hybrid." Hot brine is obtained from a well. Steam separated from the brine drives a steam turbine, and additional heat is extracted from the brine in a binary heat exchanger, vaporizing a nonaqueous working fluid which drives another turbine (not shown).

Commonly, a pump is installed downhole in a geothermal well to push the brine to the surface. Cavitation inside the pump causes separation of a vapor phase, increasing brine pH and creating conditions that favor rapid precipitation of calcite. Chemicals that inhibit the precipitation of calcite are injected downhole in each well below the pump intake to prevent scale deposition inside and near to the pump. Because decreasing temperature increases the solubility of calcite, and because the steam separators are not especially sensitive to scale deposition, this treatment usually suffices to control scale deposition in the steam separators as well.

However, the binary heat exchanger is highly sensitive to scale deposition and precipitation of solids. Scale deposited on the water side of the heat exchange surfaces seriously degrades heat transfer performance and increases the pressure drop of brine flowing through the binary heat exchanger, while solids precipitated from the brine tend to accumulate at the tube sheets, plugging the tubes. Magnesium silicate is a frequent constituent of scale that forms inside the heat exchange tubes; iron silicates, calcium silicates, calcium carbonate, clay minerals and sulfide minerals are also encountered.

Continuing precipitation of solids can also damage the reinjection wells by accumulating in the wellbore or cementing the cracks and pores in the reservoir rock, reducing permeability.

Scale deposition in the binary heat exchanger and reinjection wells must be controlled to maintain proper performance of the power plant. Commonly, an inhibitor specially developed to inhibit deposition of silicate minerals is added to the brine before it enters the binary heat exchanger. Silicate inhibitors are expensive, and using them dramatically increases operating costs. This problem of high treatment cost has been recognized from the time that steam-binary hybrid geothermal power plants were first operated some twenty years ago, but remains unsolved.

PRIOR ART

Grens and Owen, "Field Evaluation of Scale Control Methods: Acidification", Geothermal Resource Council Transactions, Vol 1, May 1977 teach adding acid to flashed geothermal brine to control silica scale. Gallup et al., U.S. Pat. No. 4,537,684 teach adding a reducing agent to flashed geothermal brine together with sufficient hydrochloric acid to decrease pH by 0.1 to 0.5 units to control iron silicate scale. These methods were developed in application to very highly saline geothermal brines containing 20 weight percent or more dissolved salts. These hypersaline brines are characterized by very low alkalinity; therefore, a modest amount of acid suffices to overwhelm the alkalinity and decrease brine pH by an effective amount. More typical geothermal brines, which contains five percent or less dissolved salts, generally have higher alkalinity than the hypersaline brines, and the amount of acid needed to decrease pH by an effective amount is prohibitive. In either case, decreasing pH increases the corrosivity of the brine. If acid in excess of the alkalinity is added to the brine, pH drops precipitously, and severe corrosion results.

Steam separated from geothermal brine contains most of the gases initially dissolved in the brine. Most of these gases in the steam fail to condense with the steam, and are removed from the condenser in relatively concentrated form commonly called "noncondensible gases" or "NCGs". Gallup et al., U.S. Pat. No. 5,085,782 teaches treating the NCGs to remove hydrogen sulfide, then combining the treated NCGs with the flashed brine at an unspecified location to decrease pH and scaling potential. Because oxygen is present in the NCGs, combining NCGs with the brine would make it highly corrosive.

Bronicki et al., U.S. Pat. No. 5,598,706 provide a steam-binary hybrid power plant wherein steam separated from the brine drives a steam turbine and is condensed above atmospheric pressure and temperature above 100° C. in a surface condenser where heat is transferred to a boiling organic fluid instead of cooling water. The heat remaining in the flashed brine boils additional organic fluid in a binary heat exchanger, and organic vapor from both sources drives vapor turbines as in a conventional steam-binary hybrid. Bronicki further teaches combining the NCGs from the steam condenser with the brine downstream of the binary heat exchanger as it flows toward the reinjection wells in order to dispose of the NCGs and decrease the pH and scaling potential of the reinjected brine.

McCabe et al., U.S. Pat. No. 4,428,200 provide a brine treatment apparatus for use with hypersaline brines, wherein silica and metal silicates are induced to precipitate from the brine by contacting the flashed brine with a sludge blanket of precipitated solids dispersed in the brine inside a reactor-clarifier prior to disposal in a reinjection well. McCabe further teaches separating the NCGs from the brine in a gas separator before the brine is flashed to produce steam, and introducing the NCGs into the head space of the reactor-clarifier above the surface of the fluid sludge in order to maintain a pressure slightly greater than atmospheric and thereby keep air from entering the reactor-clarifier. Contact of the NCGs with the brine is limited, and for several reasons, very little if any of the NCGs dissolve in the brine. Because the brine in the reactor-clarifier is nearly boiling, the gas above the liquid is mostly water vapor, and the mole fraction of NCGs in it is small. Also, the flow velocities of liquid and gas at the liquid-vapor interface are not very large, and the viscosity of the sludge is increased by the presence of the precipitated, colloidal solids, decreasing the level of turbulence and the effective diffusion coefficient. In fact, it is better that solution of NCGs in the brine is avoided, because decreasing the rate of precipitation of solids would interfere with proper operation of the reactor-clarifier, which is meant to remove as much dissolved silica as possible from the flashed brine before it is delivered to the reinjection well. McCabe does not suggest treating brine in a reactor-clarifier then passing it through a binary heat exchanger.

SUMMARY OF THE INVENTION

My invention comprises separating a small amount of vapor rich in carbon dioxide from the brine prior to the main stage of steam separation and combining that gas-rich vapor with the flashed brine before it enters the binary heat exchanger, whereby the pH of the brine is decreased and supersaturation in respect to pH sensitive minerals is reduced, thus inhibiting or completely blocking precipitation and scale deposition.

The evolution of vapor from the brine that occurs when pressure drops below the bubble point quickly strips dissolved gases from the brine. The first portion of vapor that evolves from the brine contains a large concentration of $CO_2$ and a substantial fraction of the $CO_2$ initially dissolved in the brine. If physically separated from the brine before the brine goes to the main stages of steam separation (which provide steam to the turbine), this first portion of vapor or gas-rich steam provides a source of $CO_2$ in relatively concentrated form essentially at no cost.

The main stages of steam separation strip nearly all of the $CO_2$ from the brine, driving up the pH and causing a variety of minerals to precipitate and/or form solid deposits.

Returning to the flashed brine part or all of the gas-rich vapor earlier separated from the brine will cause the pH of the brine to drop dramatically, slowing or entirely stopping the precipitation of the pH sensitive minerals. Because the concentration of $CO_2$ in the first portion of vapor separated from the brine is large, the actual volume of this gas-rich vapor that must be added to the flashed brine to decrease pH and stop pH sensitive minerals from precipitating is small. Returning to the flashed brine just a fraction of the $CO_2$ initially present in the brine suffices to dramatically decrease brine pH and inhibit precipitation of pH sensitive minerals.

In this way, the binary heat exchanger and injection wells of a steam-binary hybrid geothermal power plant can be protected from the detrimental effects of precipitation and scale deposition without the expense and bother of providing chemicals from without. Also, atmospheric emissions of $CO_2$, hydrogen sulfide and other gases are decreased, because the gases contained in the gas-rich vapor returned to the brine are reinjected into the geothermal reservoir together with the brine.

Separating gas-rich vapor from the brine before the main stage of steam separation decreases the amount of steam provided to the steam turbine. However, combining the gas-rich vapor (which also contains steam) with the flashed brine going to the binary heat exchanger increases the temperature of the flashed brine, allowing more organic vapor to be produced, whereby the gross power generated by the organic vapor turbine is increased. Also, separating gas-rich vapor from the brine before the main stage of steam separation decreases the concentration of NCGs in the steam, thereby decreasing the amount of steam or vacuum pump power consumed by the NCG removal system and/or allowing the condenser to operate at slightly lower pressure. These beneficial effects slightly increase the net power output of the power plant. In combination, these effects nearly cancel out, whereby the effect on net power output is small, and in some circumstances may be positive; that is, a small increase in power output.

DEFINITION OF TERMS

By "acidify" I mean "decrease the pH of the brine."

By "amount of $CO_2$ added to the brine" I mean the amount of $CO_2$ that actually dissolves in the brine. If a separate gas phase results and part of the $CO_2$ partitions into the gas phase instead of dissolving in the brine, the $CO_2$ that stays in the gas phase will have no beneficial effect.

By "combine" I mean put the gas-rich vapor into the same pipeline, conduit, vessel or cavity together with the flashed brine.

Normally, some amount of hydrogen sulfide will also be present in the gas-rich vapor returned to the flashed brine, and trace amounts of other gases will also be present. When I describe the effect of combining a certain amount of gas-rich vapor to the brine, I am referring to the composite effect of adding $CO_2$ and the other gases present in the gas-rich vapor.

By "geothermal fluid" I mean any one of geothermal brine, or geothermal steam, or a two phase mixture of brine and steam.

In claims 1 and 13-15 the term "geothermal brine" includes brine from which a small amount of vapor has been separated as well as flashed geothermal brine.

Figure 2:
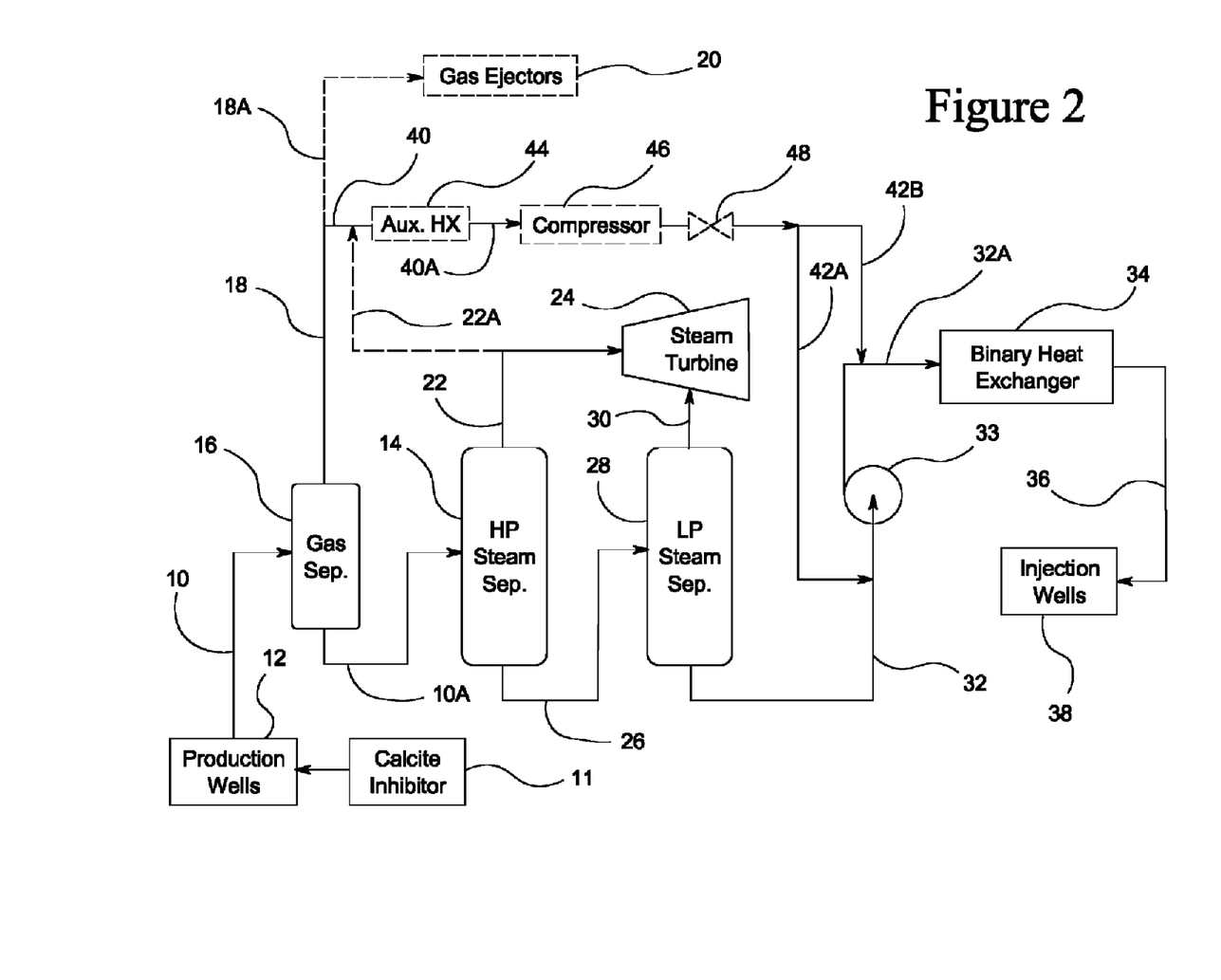
FIG. 2 illustrates the preferred embodiment of the invention: a steam-binary hybrid geothermal power plant wherein a small volume of gas-rich vapor is separated from the brine and combined with the flashed brine before it enters the binary heat exchanger.

By "main stage steam separators" I mean steam separators that separate from the geothermal brine a substantial amount of steam which is provided to a steam turbine; for example, high pressure steam separator 14 and low pressure steam separator 28 in FIGS. 1 and 2. A steam-binary hybrid geothermal power plant will have at least one main stage steam separator, and two stages are commonly employed. A power plant can have three or more stages of main steam separators, and each stage can consist of a single steam separator, or two or more separators operated in parallel can constitute a single stage.

By "fluid conductive means", I mean a pipeline or a tube or another sort of conduit through which the gas-rich vapor flows from the gas separator to the location where it is combined with flashed geothermal brine. Normally but not necessarily, the fluid conductive means would comprise a steel pipe covered with thermal insulation. Multiple pipes, tubes or conduits installed in parallel could serve as fluid conductive means.

"Mole fraction of $CO_2$" means the number of moles of $CO_2$ present in the gas-rich vapor divided by the total number of moles of all gases, including water vapor, present in the gas-rich vapor. "Mole-percent carbon dioxide" is the mole fraction carbon dioxide expressed as a percentage. For example, if the gas-rich vapor contains 44 grams=1 mole of $CO_2$ and 162 grams=9 moles of water vapor and nothing else, the mole fraction of $CO_2$ will be 0.10, and the mole-percent (mole-%) of carbon dioxide will be 10.

In the claims, "mole-percent carbon dioxide" refers to the mole fraction of $CO_2$ in the gas-rich vapor 42A or 42B that is actually combined with flashed geothermal brine 32. If gas-rich vapor 40 or high pressure steam 22A is partly condensed in auxiliary heat exchanger 44, the mole fraction of $CO_2$ in gas-rich vapor 40A leaving auxiliary heat exchanger 44 and subsequently combined with flashed geothermal brine 32 will be much larger than the mole fraction of $CO_2$ in gas-rich vapor 18 when it is first separated from the brine.

"Saturation Ratio" is a quantity known to physical chemists and geochemists. It is equal to the product of ion activities that corresponds to the chemical reaction involved in precipitating that mineral from solution divided by the value that the ion activity product would have when that mineral is at chemical equilibrium with the brine.

"log S" is the common logarithm of the saturation ratio. When log S is positive, the brine is supersaturated in respect to a given mineral, and that mineral may precipitate from the brine. When log S is negative, the brine is undersaturated in respect to that mineral, and that mineral would tend to dissolve when brought into contact with the brine.

By "Total Alkalinity" (abbreviated TA), I mean the amount of strong acid that must be added to the decrease the pH of the brine sufficiently to make bromcresol green (used as a pH indicator) change color at about pH 4.5. I express "Total Alkalinity" and the other alkalinity functions defined below in units of equivalents/kg-$H_2O$ in the brine; that is, molal units. This definition differs from "Alkalinity" as defined in Section 2320B in *Standard Methods for the Examination of Water and Wastewater*, $17^{th}$ Ed. only in respect to the units employed to express the result.

By "Carbonate Alkalinity" (abbreviated CA), I mean the amount of alkalinity present in the brine in association with bicarbonate and carbonate ions. Because concentration of carbonate is always much smaller than the concentration of bicarbonate, "Carbonate Alkalinity" is practically equal to the concentration of bicarbonate ion in the brine.

By "Noncarbonate Alkalinity" (abbreviated NCA), I mean the amount of alkalinity present in the brine in excess of the alkalinity associated with bicarbonate and carbonate in the brine. "Carbonate Alkalinity" and "Noncarbonate Alkalinity" can readily be determined using a two-way titration procedure as follows:
1. Measure and record the initial pH of the brine.
2. Titrate with a strong acid (for example, a solution of HCl) to the bromcresol green end-point at about pH 4.5. The result of this titration is "Total Alkalinity" as defined above.
3. Purge the brine with an inert gas that contains no $CO_2$ to remove from the acidified brine any $CO_2$ released by adding acid to the brine.
4. Titrate the brine with a strong base (for example, a solution of NaOH) to restore the brine to its initial pH value. The result of this titration is the "Noncarbonate Alkalinity."
5. Finally, $$\text{"Carbonate Alkalinity"}=\text{"Total Alkalinity"}-\text{"Noncarbonate Alkalinity"} \quad (1)$$

Unflashed brine contains $CO_2$ in solution, the total alkalinity is practically equal to the concentration of bicarbonate ion ($HCO_3^-$) in the brine, and noncarbonate alkalinity is practically zero. When steam equivalent to several percent of the water initially present in the brine is separated from the brine in the high pressure steam separator, essentially all of the dissolved $CO_2$ is removed from the brine, and part of bicarbonate decomposes producing additional $CO_2$ (which is removed from the brine with the steam) and hydroxide ion:

$$HCO_3^- \rightarrow CO_2\uparrow + OH^- \quad (2)$$

The hydroxide ion thus produced immediately reacts with boric acid or silicic acid present in the brine, producing the corresponding anion:

$$B(OH)_3 + OH^- \rightarrow B(OH)_4^- \quad (3)$$

$$Si(OH)_4 + OH^- \rightarrow Si(OH)_3O^- + H_2O \quad (4)$$

Thus, total alkalinity is unchanged; however, part of the carbonate alkalinity is replaced by an equivalent amount of noncarbonate alkalinity, which in a typical geothermal brine is practically equal to the sum of concentrations of the borate and silicate anions.

DETAILED DESCRIPTION OF THE INVENTION

FIG. 1 illustrates a prior art steam-binary hybrid geothermal power plant in simplified form, showing only components directly relevant to the present invention.

Geothermal brine 10, 10A flows from production wells 12 to high pressure steam separator 14. Calcite inhibitor 11 is added to the brine while still in the wellbore, preferably before a vapor phase starts to separate from the brine. High pressure steam 22 separated from the brine is conducted to the high pressure inlet of steam turbine 24. Single flashed brine 26 flows from high pressure steam separator 14 to low pressure steam separator 28. Low pressure steam 30 is conducted to the low pressure inlet of steam turbine 24. Pump 33 increases the pressure of brine 32 as needed to propel it through binary heat exchanger 34 and on to injections wells 38. Silicate inhibitor 31 is added to double flashed brine 32 before it enters binary heat exchanger 34. Heat depleted brine 36 flows to injection wells 38.

Optionally, gas separator 16 can be added to the brine handling system prior to high pressure steam separator 14. A relatively small volume of gas-rich vapor 18 is separated from brine 10, and partly degassed brine 10A flows to high pressure steam separator 14. Gas-rich vapor 18, which contains a substantial fraction of the $CO_2$ and other gases initially dissolved in geothermal brine 10, is conducted to a vent 19 and discharged to the atmosphere to get rid of the gases. Decreasing the gas content of the brine in this way before it enters high pressure steam separator 14 decreases the gas content of high pressure steam 22, thereby substantially decreasing the load on the gas ejectors (not shown).

Sometimes gas separator 16 is operated at a lower pressure to produce a larger volume of gas-rich vapor 18A that is used to power steam jet gas ejectors. Because the pressure of gas-rich vapor 18A is greater than the pressure of high pressure steam 22, the amount of gas-rich vapor 18A consumed is less than the amount of high pressure steam 22 that would otherwise be needed to power the gas ejectors. In this case, gas-rich vapor 18A contains most of the gases initially present in the brine.

FIG. 2 illustrates a steam-binary hybrid geothermal power plant modified according to my invention. Part or all 40 of gas-rich vapor 18 from gas separator 16 is combined with twice flashed brine 32, producing acidified brine 32A which goes to binary heat exchanger 34 and subsequently to injection wells 38. The lower pH of acidified brine 32A decreases or completely stops precipitation of pH sensitive minerals, reducing or completely eliminating the need to add a silicate inhibitor to brine entering the binary heat exchanger. Optionally, gas rich vapor 18 can be divided, with part 40 used to acidify the flashed brine, while part 18A is used to power gas ejectors 20 or vented.

In the absence of gas separator 16, most of the $CO_2$ initially dissolved in the brine is stripped from brine 10 in HP separator 14 and ends up in high pressure steam 22. In some cases it may be advantageous to divert a small amount of high pressure steam 22A and combine it with flashed brine 32 to acidify it, instead of installing gas separator 16 to supply gas-rich vapor 40.

Optionally, adjustable control valve 48 can be used to control the amount of gas-rich vapor 40 that is combined with flashed brine 32 and thereby the pH of acidified brine 32A. The pressure drop across adjustable control valve 48 renders gas-rich vapor 40 superheated downstream of valve 48, preventing condensation which might otherwise produce a small volume of condensate which is acidic and corrosive because of the amount of $CO_2$ dissolved in it due to the large partial pressure of $CO_2$ in gas-rich vapor 40.

Optionally, gas-rich vapor 40 can be passed through auxiliary heat exchanger 44 wherein most of the water vapor in it is condensed, and the heat released is used to preheat an organic liquid, or to boil an organic liquid producing vapor that goes to a vapor turbine, or to boil water to produce clean steam which goes to a steam turbine or to steam jet gas ejectors, or for another beneficial purpose. Using auxiliary heat exchanger 44 is preferred in case high pressure steam 22A is employed to acidify the flashed brine, because the mole fraction of water vapor in high pressure steam 22A will usually be quite large.

Auxiliary heat exchanger 44 can be a separate unit, or simply a section within binary heat exchanger 34; for example, a few tubes provided with their own steam chests rather than water boxes. The remaining vapor phase 40A that flows out of auxiliary heat exchanger 44 contains most of the $CO_2$ that entered auxiliary heat exchanger 44, and is combined with flashed brine 32 to produce acidifed brine 32A. The condensate that comes out of auxiliary heat exchanger 44 (which contains much less $CO_2$) can also be combined with flashed brine 32 but need not be.

The specific implementation of the invention will depend on the pressure of gas-rich vapor 40 (or high pressure steam 22A) and the mole fraction of $CO_2$ in it. Four distinct situations can arise. In the following discussion P(GS)=pressure in the gas separator,
P(HX)=pressure in the heat exchanger,
$X(CO_2,40)$=mole fraction of $CO_2$ in gas-rich vapor 40; that is, before the gas-rich vapor goes through auxiliary heat exchanger 44 if one is present. This mole fraction does not correspond to mole-percent carbon dioxide in the claims; the mole-percent values in the claims describe the gas-rich vapor at the point where it is combined with the flashed brine.
$X(CO_2,40$ or $22A)$=mole fraction of $CO_2$ in gas-rich vapor 40 or high pressure steam 22A whichever is employed to acidify the brine; comments above apply.

The distinction between "large" and "small" values of $X(CO_2,40$ or $22A)$ will depend on other factors specific to a given application which will determine which of the options described below should most beneficially be implemented.

Case 1: $P(GS)>P(HX)$ and $X(CO_2,40)$ is large

In this case, compressor 46 is not needed, and gas-rich vapor 40 is preferably combined with flashed brine 32 downstream of pump 33; that is, following path 42B. If $X(CO_2,40)$ is fairly large (for example, above 10 mole-%), the amount of water vapor in gas-rich vapor 40 will be modest, and auxiliary heat exchanger 44 would be of little benefit. Alternatively, if $X(CO_2,40)$ is large and pump 32 has sufficient suction head, gas-rich vapor 40 can be combined with brine 32 upstream of pump 33 following path 42A. Pump suction must be considered in this case, because the water vapor added to brine 32 with gas-rich vapor 40 will increase the temperature and vapor pressure of the brine, possibly causing cavitation and reducing the efficiency of pump 33 if suction head is insufficient.

Case 2: $P(GS)>P(HX)$ and $X(CO_2,40$ or $22A)$ is small

In this case path 42B can be used, and auxiliary heat exchanger 44 can optionally be used to condense most of the water vapor in gas-rich vapor 40 or high pressure steam 22A. Gas-rich vapor 40 or high pressure steam 22A can also be combined with brine 32 upstream of pump 33 following path 42A; in this case auxiliary heat exchanger 46 should be used to prevent boiling and cavitation at the suction of pump 33.

Case 3: $P(GS)<P(HX)$ and $X(CO_2,40)$ is large

In this case gas-rich vapor 40 can be combined with brine 32 upstream of pump 33 following path 42A if sufficient suction head is available. Optionally, gas-rich vapor 40 can be combined with brine 32 downstream of pump 33 following path 42B if compressor 46 is used. Auxiliary heat exchanger 44 is desirable in this case to minimize the amount of water vapor that enters compressor 46.

Case 4: $P(GS)<P(HX)$ and $X(CO_2,40$ or $22A)$ is small

In this case auxiliary heat exchanger is needed to remove water vapor from gas-rich vapor 40 or high pressure steam 22A. Compressor 46 is needed if path 42B is followed.

Figure 3:
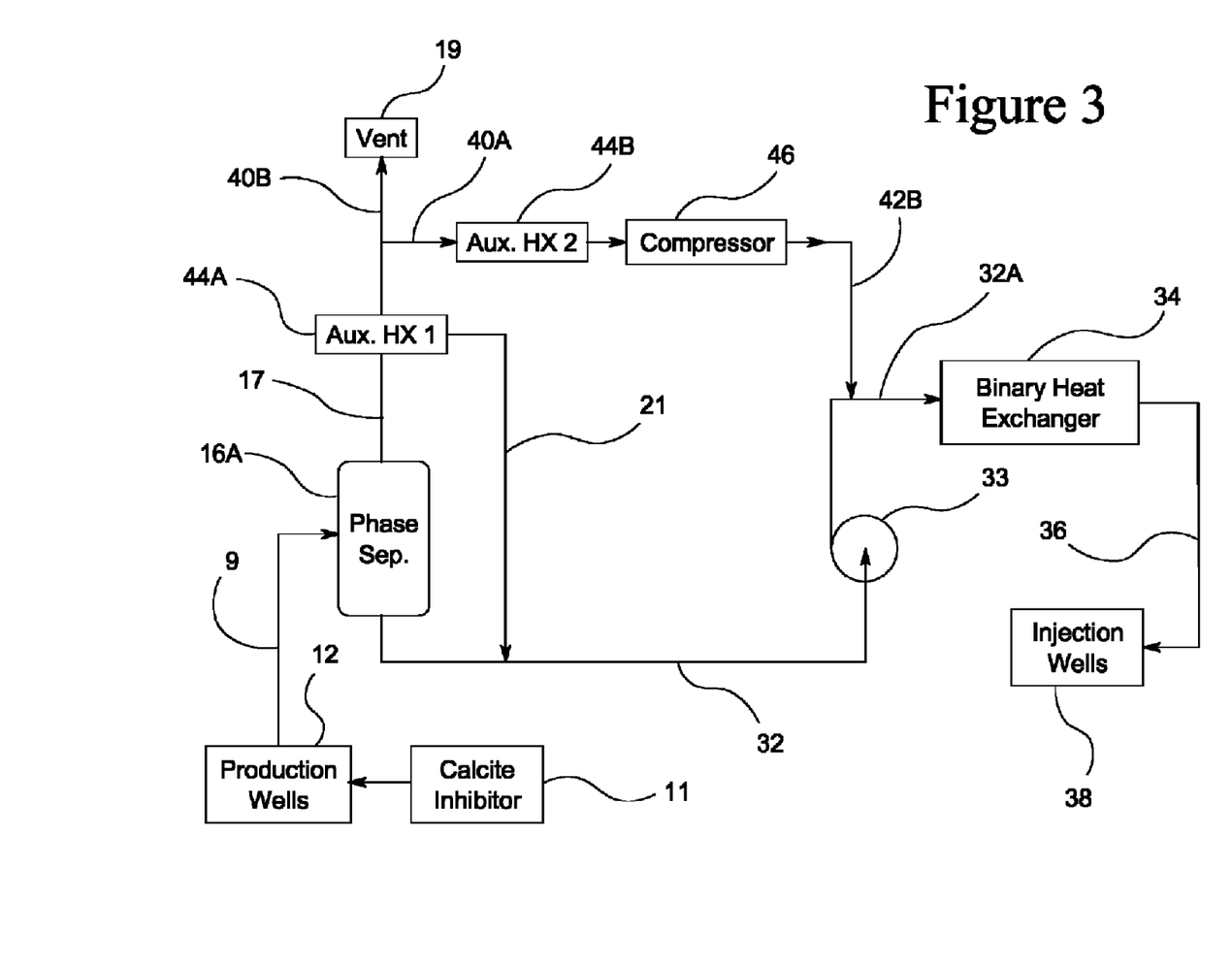
FIG. 3 illustrates a different embodiment of the invention, implemented in a geothermal power plant which receives a two phase mixture of geothermal brine and steam, but has no steam turbine.

FIG. 3 illustrates the invention implemented in a geothermal power plant which receives a two phase mixture of geothermal brine and steam but has no steam turbine. Stable, thermodynamically efficient operation of binary heat exchanger 34 requires that the brine flowing through it be single phase liquid or very nearly so. If production wells 12 produce a two phase geothermal fluid 9 but not enough steam can be separated from it to make a steam turbine practical, phase separator 16A is used to remove vapor phase 17 from two phase geothermal fluid 9 and the resulting single phase brine 32 goes to binary heat exchanger 34 by way of pump 33. Vapor phase 17 flows through first auxiliary heat exchanger 44A which is, in this case, typically a section within binary heat exchanger 34. In the prior art, gas rich vapor 40A flowing out of first auxiliary heat exchanger 44A is vented 19 to the atmosphere and condensate 21 is combined with brine 32.

The amount of $CO_2$ dissolved in condensate 21 is too small to significantly decrease the pH of brine 32.

The invention is easily implemented in a power plant of this design by adding compressor 46 to compress a predetermined portion of gas-rich vapor 40A, allowing it to be combined with the brine downstream of pump 33 following path 42B. The pH of acidified brine 32A is thereby decreased, and deposition of solids in binary heat exchanger 34 and injection wells 38 is decreased. Because just a fraction of the $CO_2$ in vapor 17 will usually suffice to acidify the brine, remainder 40B of the gas rich vapor coming from first auxiliary heat exchanger 44A can be vented to the atmosphere, optionally after treating it to remove $H_2S$. A smaller second auxiliary heat exchanger 44B can beneficially be added to the system to remove additional water vapor from gas-rich vapor 40A and minimize the volume of vapor that must be compressed.

Operation of the Invention

By way of example of operation of my invention, chemical equilibrium and the solubility of several minerals was calculated as the brine passes through a typical steam-binary hybrid power plant. Table 1 presents the composition of the brine modeled before any steam was separated from it. This composition does not represent any specific geothermal project, but falls within the range of brine composition commonly encountered and thus may be considered typical.

Table 2 summarizes the calculated results. "X" is the cumulative steam fraction; that is, the total amount of water that has been separated from the brine as steam up to that point in the system, expressed as a percentage of water initially in the brine. "Total $CO_2$" is the sum of $CO_2$ as such dissolved in the brine, plus bicarbonate and carbonate.

Calcite would be deposited from the flashed geothermal brine in nearly every case unless calcite inhibitor is applied. Talc and diopside are modeled as representative of magnesium silicate and calcium silicate deposits which typically are poorly crystallized and variable in composition, and sphalerite (ZnS) is representative of the sulfide minerals sometimes observed. Results for amorphous silica, another common scale constituent, are not presented, because amorphous silica would not precipitate from this brine under any condition modeled here and its solubility is much less sensitive to pH.

In all cases, the brine starts out saturated with calcite, dolomite, sphalerite and quartz (not shown) down in the geothermal reservoir ("Unflashed" in Table 2), but is initially undersaturated in respect to talc and diopside.

Separating steam from the brine in the HP (High Pressure) Steam separator increases the saturation ratios calculated for all five minerals, and separating more steam from the brine in the LP (Low Pressure) Steam Separator further increases the saturation ratios.

Returning to the flashed brine an amount of $CO_2$ equal to 9.5% of the molecular $CO_2$ (that is, $CO_2$ as such) initially dissolved in the brine decreases the pH by nearly 2 units (the difference between "LP Steam Sep." and "Heat Exch.-In") and sharply decreases the saturation ratio for each mineral. The value of log S for diopside is now negative at the inlet of the binary heat exchanger. The values of log S for calcite, dolomite and talc are positive at the inlet of the binary heat exchanger but small, and negative at the outlet of the binary heat exchanger. Log S for sphalerite is decreased, but remains positive. Under these mild conditions, calcite inhibitor 11 added to the brine downhole probably would suffice to protect the binary heat exchanger as well as the steam separators. (Calcite inhibitors commonly inhibit precipitation of silicate minerals to some degree as well, though not as well as products specifically developed to inhibit silicate deposits.) Thus, returning to the flashed brine just 9.5% of the $CO_2$ initially present in the brine would suffice to largely prevent deposition of carbonates and silicates in the binary heat exchanger. Deposition of sulfides would also be decreased and would in any case be small or insignificant in proportion to the small concentration of sulfide forming metals in the brine. The precipitation of clay minerals, the solubility of which also drops with increasing brine pH, would also be inhibited.

Removing 9.5% of the $CO_2$ from the brine would cause the brine to become just slightly supersaturated in respect to calcite, dolomite and sphalerite in gas separator 16 and would slightly increase log S for all five minerals in HP steam separator 14. The effect upon saturation levels in LP separator 28 would be insignificant. Calcite inhibitor 11 added to prevent deposition of calcite in production wells 12 would prevent scale deposition in gas separator 16, and the practical effect of slightly increased saturation ratios in the steam separators would be insignificant.

Returning to the flashed brine 16% of the molecular $CO_2$ initially dissolved in the brine would decrease pH even further, resulting in undersaturation in respect to calcite, dolomite, talc and diopside at the inlet of the binary heat exchanger as well as the outlet. In this case, the $CO_2$ returned to the brine would by itself completely inhibit precipitation of carbonates and silicates in the binary heat exchanger and injection wells, with no reliance on scale inhibitors which may already be present in the brine.

Figure 4:
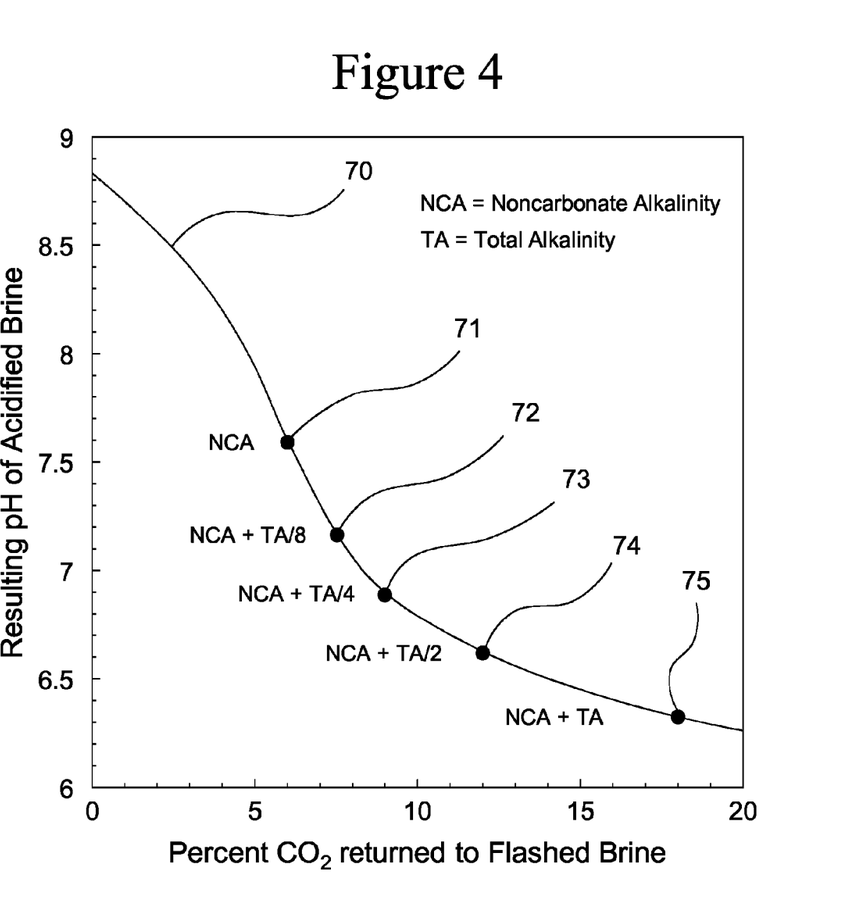
FIG. 4 shows the resulting pH of the flashed brine measured at the entrance to the binary heat exchanger as a function of the amount of $CO_2$ added to it. The abbreviation "TA" stands for "Total Alkalinity" and "NCA" stands for "Noncarbonate Alkalinity." The points are labeled to indicate the amount of $CO_2$ returned to the brine. For example, point 71 is labeled "NCA" and this means that the amount of $CO_2$ returned to the brine, expressed in moles $CO_2$/kg-$H_2O$ in the brine is equal to the Noncarbonate Alkalinity of the flashed brine expressed in equivalents/kg-$H_2O$ in the brine. The pH values plotted in FIG. 4 are not entirely consistent with the pH values presented in Table 2 because a different, simpler computer program was used to calculate the pH values plotted in FIG. 4.

FIG. 4 illustrates pH 70 of acidified brine 32A as a function of percentage $CO_2$ initially present in the brine that is returned to the flashed brine. Returning to the brine 8-10% of the $CO_2$ initially present in the brine would give a pH value of 7.0 or slightly lower which is believed to be optimal. The curve flattens out as the fraction of $CO_2$ returned to the brine goes above 10%, because brine pH is governed by the ratio of $CO_2$ to bicarbonate in the brine, and the concentration of bicarbonate does not change once the amount of $CO_2$ returned to the brine exceeds the noncarbonate alkalinity in the flashed brine (discussed below). Thus, accidentally overfeeding $CO_2$ would not cause a precipitous drop in pH that might cause corrosion as might happen if HCl or sulfuric acid were used instead.

The variation of resulting brine pH with percentage of total $CO_2$ returned to the brine depends on the amount of $CO_2$ originally in the brine and the alkalinity of the brine; thus, the plotted curve in FIG. 4 is specific to the brine composition in Table 1. In fact, the variation of pH with amount of $CO_2$ returned to the brine can be expressed in a more fundamental and more general manner in terms of moles of $CO_2$ added to the brine relative to alkalinity in the brine.

Point 71 in FIG. 4 illustrates the effect of adding to the brine moles of $CO_2$ equal to equivalents of noncarbonate alkalinity (NCA) in the brine. The $CO_2$ will react with borate and silicate ions present in the brine, producing bicarbonate and creating a situation where, to a good approximation, $$\text{Total Alkalinity} = \text{Concentration of Bicarbonate} = \text{Carbonate Alkalinity} \qquad (5)$$

and NCA is practically absent. If there were no boric acid or silicic acid present in solution, the pH of the brine in this state would be governed by hydrolysis of bicarbonate to produce trace amounts of carbonate and $CO_2$, and the pH would be approximately equal to the average of the first and second $pK_a$ values of $CO_2$, corrected for the effect of ion activity coefficients<1. Usually, as in this calculated example, the actual pH value will be somewhat lower due to a small degree of dissociation of boric acid and silicic acid.

If $CO_2$ in excess of Noncarbonate Alkalinity is added to the brine (points 72 to 75), an amount of $CO_2$ equal to the NCA will react with borate and silicate anions, converting all of the alkalinity to carbonate alkalinity (that is, bicarbonate), and the $CO_2$ in excess of NCA will remain in solution as $CO_2$. The pH of the brine will then be controlled by the $CO_2$/bicarbonate buffer:

$$pH = pK_a + \log(C_{Bicarb}/C_{CO2}) + \log(\gamma_{Bicarb}/\gamma_{CO2}) \quad (6)$$

where $pK_a$ is minus the logarithm of the first dissociation constant of $CO_2$, and C and γ refer to the concentration and activity coefficient of the species indicated by the subscripts. In each case represented by points 72 to 75, $C_{Bicarb}$ equals TA, and $C_{CO2}$ equals the amount of $CO_2$ added in excess of NCA.

For example, point 72 represents a situation where $C_{Bicarb}$=TA and $C_{CO2}$=TA/8; therefore, $$pH = pK_a + \log(TA/(TA/8)) + \log(\gamma_{Bicarb}/\gamma_{CO2}) = pK_a + 0.90 + \log(\gamma_{Bicarb}/\gamma_{CO2}) \quad (7)$$

Doubling the excess of $CO_2$ added over NCA (that is, moving from point 72 to point 73) decreases pH by 0.30 units. Each successive doubling of the excess of $CO_2$ added over NCA (point 73 to 74, point 74 to 75) decreases the resulting pH by another 0.30 units in a uniform and predictable manner. Because log S for each pH sensitive mineral varies in a linear manner with pH, the simple mathematical relationship explained above provides an easy way to determine how much $CO_2$ should be returned to the brine to achieve the pH value desired and decrease the value of log S for a given mineral to the degree needed to control scale deposition.

Adding $CO_2$ equal to NCA (point 71) reduces the pH of the flashed brine by about 1.2 units to about pH 7.6. This change is sufficient to substantially decrease the saturation ratios for the various pH sensitive scale minerals, and to substantially decrease the rate of scale deposition.

Because the curve of pH vs. $CO_2$ gradually flattens out, adding more and more $CO_2$ generates diminishing returns in respect to decreasing pH and decreasing the value of log S for the various minerals. Of course, once enough $CO_2$ has been added to decrease log S to 0, deposition of that mineral will be completely blocked, and increasing the amount of $CO_2$ will be of no further benefit. Adding $CO_2$ to the brine in excess of the amount needed to make log S=0 will simply decrease the amount of power generated (by decreasing the amount of steam that goes to the turbine) and make the brine more corrosive. When the amount of $CO_2$ added to the brine (moles) is equal to NCA+TA (equivalents)

$$pH = pK_a + \log(\gamma_{Bicarb}/\gamma_{CO2}) \quad (8)$$

and there is little benefit to be gained by adding more.

Adding any amount of $CO_2$ to the brine will decrease the rate of scale deposition. However, it is preferred that the number of moles of $CO_2$ added to the brine at least equal the equivalents of NCA in the brine (point 71 in FIG. 4). Adding moles of $CO_2$ at least equal to NCA+TA/8 (point 72) will provide more benefit, and adding moles of $CO_2$ at least equal to NCA+TA/4 (point 73) will provide even greater benefit. However, the additional benefit of adding moles of $CO_2$ in excess of NCA+TA/2 (point 74) will be small, and adding moles of $CO_2$ greater than NCA+TA (point 75) will provide little or no additional benefit while increasing the risk of corrosion.

The desired range of operation can also be specified in terms of the effect upon scaling rate determined using scale deposition coupons located at the entrance and exit of binary heat exchanger 34. The scale deposition rate is conveniently determined as weight gain of the coupon per day divided by the surface area of the coupon exposed to the brine. The scaling rate should first be determined without combining the gas-rich vapor with the flashed brine, and then determined again while combining gas-rich vapor with the brine. In order to isolate the effect of combining the gas-rich vapor with the brine, both determinations should be made without adding silicate inhibitor 31 at the entrance to binary heat exchanger 34.

Enough gas-rich vapor should be combined with to the brine to decrease the scale deposition rate at the entrance to binary heat exchanger 34 by at least 50%, and more preferably by at least 75%. Alternatively, enough gas-rich vapor should be combined with the brine to decrease the scale deposition rate at the exit from binary heat exchanger 34 by at least 50%, and more preferably by at least 75%.

The desired range of operation can also be specified in terms of the change in pH of the brine caused by combining gas-rich vapor with the brine. The change in pH value claimed refers to brine pH at the exit of binary heat exchanger, measured at T and P that exist at that point. The rate of scale deposition will be noticeably decreased if pH is decreased by 0.5 unit, but the benefit will be greater if pH is decreased by 1.0 unit, and still greater if pH is decreased by 1.5 unit or more.

CONCLUSIONS AND RAMIFICATIONS

Although the description above contains many specificities, these should not be construed as limiting the scope of the invention but merely as providing examples of some of the presently preferred embodiments. Thus the scope of the invention should be determined by the appended claims and their legal equivalents, rather than by the examples given.

My invention allows scale deposition in the binary heat exchanger of a steam-binary hybrid geothermal power plant to be controlled at low cost. It will in some cases also benefit a binary cycle power plant that has no steam turbine. In the calculated example, returning to the flashed brine just 9.5% of the $CO_2$ initially present in the brine would decrease brine pH to 6.77, enough to inhibit deposition of carbonates and silicates in the binary heat exchanger. To achieve the same result using mineral acids would require adding 491 pounds of 28% hydrochloric acid to each million pounds of brine entering the power plant, and accidentally overfeeding the acid would risk a precipitous drop in pH, causing severe corrosion; using $CO_2$ to acidify the flashed brine doesn't carry that risk.

While I have calculated and presented saturation ratios for just a few representative scale forming minerals, precipitation of other minerals whose solubility depends on pH would be inhibited as well. Deposition of amorphous scale silica would not be an issue with the brine composition modeled, but could present a serious problem in relation to a brine that is initially hotter and contains more silica in solution. While solubility of silica varies little over a wide range of pH, decreasing pH inhibits silica precipitation by slowing down the chemical reactions involved. Thus, my invention would also inhibit, or at least slow down, deposition of silica scale in situations where it might occur.

Some geothermal well fields include gas separators installed at some distance from the geothermal power plant, where gases are separated from the brine before the brine is conducted to the power plant. Gas-rich vapor separated in this manner can be conducted to the power plant and combined with the flashed brine.

Most beneficially, the gas-rich vapor should be combined with the flashed brine before the flashed brine enters the binary heat exchanger, but it could also be added to the brine when the brine is already inside the binary heat exchanger; for example, by injecting the gas-rich vapor into a water box between passes in the heat exchanger. Optionally, some of the gas rich vapor can be combined with the flashed brine before it enters the binary heat exchanger, and an additional portion combined with the brine already inside the binary heat exchanger. In some cases it may prove beneficial to combine an additional portion of the gas-rich vapor with the brine after it has exited the heat exchanger to better inhibit scale deposition in the injection wells.

A power plant can include more than one generating unit. In this case, gas-rich vapor separated from brine entering one generating unit can be added to the flashed brine in another generating unit.

All of the gas-rich vapor separated from the brine can be combined with the flashed brine, or just a fraction of it. The gas-rich vapor coming from the gas separator can be divided, with part going to power gas ejectors or for another purpose, and part going to acidify the flashed brine.

Because the amount of $CO_2$ is needed to acidify the flashed brine is modest, it can be obtained by passing just a fraction of the power plant's brine supply through the gas separator. Usually, the $CO_2$ content of geothermal brine varies from well-to-well in a geothermal field. If, for example, a power plant is supplied by ten wells each one contributing about the same amount of steam, and the brine from one of these wells contains 20% of the total amount of dissolved $CO_2$ that goes to the power plant, passing just the brine from that one well through a gas separator to remove one-half of the $CO_2$ from that brine might provide enough $CO_2$ to acidify the entire volume of flashed brine.

In some cases, it may be possible to obtain the $CO_2$ needed from a high gas content, low temperature well that has little value as a source of power, or through a pipeline from the wellfield of another power plant nearby. In this case, the gas-rich vapor used might be separated from brine which does not subsequently go through the main stage steam separators.

Most beneficially, this invention will be implemented using gas-rich vapor containing the largest mole fraction of $CO_2$ that can be provided. In an installation where a dedicated gas separator is operated to provide just amount of $CO_2$ needed to acidify the brine, the mole fraction of $CO_2$ in the gas-rich vapor will be at least 7.5 mole-% and may be 25 mole-% or more or even 50 mole-% or more. The mole fraction of $CO_2$ in the gas-rich vapor will be in the same range where steam or a relatively dilute gas-rich vapor is passed through an auxiliary heat exchanger before being combined with the brine.

However, the invention can be operated with a smaller mole fraction of $CO_2$ in the gas-rich vapor; for example, where the gas separator is operated at a lower pressure to provide motive steam to jet ejectors, where some steam is simply diverted from the HP steam separator, or where the fluid provided to the power plant is already two phase. About 1.5 mole-% is a practical lower limit to mole fraction of $CO_2$ in the gas-rich vapor because using a more dilute gas-rich vapor would entail diverting too much steam from the turbine.

Gas-rich vapor with $CO_2$ in the range 1.5-3.0 mole-% may practically be used where the alkalinity of the flashed brine is small, and little $CO_2$ is needed to significantly decrease pH and control scale deposition. In fact, 1.5 mole-% $CO_2$ is equal to 3.6 weight-% $CO_2$ which would certainly be considered "gas-rich" in other contexts.

This invention will contribute to the development of renewable geothermal energy resources by eliminating the cost of treatment chemicals that would otherwise be needed to control scale deposition in the binary heat exchanger of a geothermal power plant.

It will also promote more efficient utilization of geothermal resources, because preventing deposition of scale in the binary heat exchanger of a geothermal power plant will enable it to operate with greater thermodynamic efficiency and generate more power.

It will also decrease the emission of the greenhouse gases carbon dioxide and methane, because part (and perhaps all) of the carbon dioxide and methane that would otherwise be released to the atmosphere will be reinjected to the geothermal reservoir together with the thermally depleted geothermal brine.

Finally, it will enhance the quality of the environment, because part of the hydrogen sulfide and other pollutants like benzene and mercury which might otherwise be released to the atmosphere will be reinjected together with the thermally depleted geothermal brine.

TABLE 1

Initial Composition of the Brine Modeled

|  | mmol/kg-$H_2O$ | mg/kg |
|---|---|---|
| $Na^+$ | 150.0 | 3409 |
| $Mg^{+2}$ | 0.025 | 0.61 |
| $Ca^{+2}$ | 0.92 | 36.5 |
| $Zn^{+2}$ | $4.1 \times 10^{-6}$ | $2.6 \times 10^{-4}$ |
| $Cl^-$ | 145.9 | 5115 |
| $HCO_3^-$ | 5.92 | 357 |
| $SiO_2$ (aq) | 3.62 | 215 |
| $B(OH)_3$ | 1.00 | 61 |
| $H_2S$ (aq) | 0.20 | 6.7 |
| $CO_2$ (aq) | 50.03 | 2176 |
| Alkalinity as $CaCO_3$ | 5.95 meq/kg-$H_2O$ | 295 |
| T | 180 | |
| pH | 5.90 | |
| P (bar) | 16.0 at bubble point | |

This is the composition of the brine before any vapor has been separated from it; that is, the brine as it exists down in the geothermal reservoir, in equilibrium with calcite, dolomite, quartz and sphalerite.

TABLE 2

The Effect of Adding $CO_2$-rich Vapor from the Gas Separator to the Flashed Brine

| | | | | | Total | $\log_{10}$ (Saturation Ratio) | | | | |
|---|---|---|---|---|---|---|---|---|---|---|
| Unit | P (bar) | T (° C.) | Cumul. X(%) | pH | $CO_2$ mmol/kg | Calcite $CaCO_3$ | Dolomite $CaMg(CO_3)_2$ | Sphalerite ZnS | Talc $Mg_3Si_4O_{10}(OH)_2$ | Diopside $CaMgSi_2O_6$ |
| Prior Art - No $CO_2$ added TA = 5.95 mmol/kg NCA = 2.99 mmol/kg coming out of LP Flash | | | | | | | | | | |
| Unflashed | >16.0 | 180.0 | 0.00 | 5.90 | 55.95 | 0.00 | 0.00 | 0.00 | -1.30 | -2.64 |
| HP Steam Sep. | 3.50 | 138.5 | 8.40 | 7.66 | 5.66 | 1.37 | 2.64 | 3.23 | 7.65 | 3.00 |
| LP Steam Sep. | 1.15 | 103.6 | 14.45 | 8.70 | 2.96 | 1.76 | 3.31 | 5.07 | 11.13 | 5.12 |

TABLE 2-continued

The Effect of Adding CO₂-rich Vapor from the Gas Separator to the Flashed Brine

| Unit | P (bar) | T (° C.) | Cumul. X(%) | pH | Total CO₂ mmol/kg | log₁₀ (Saturation Ratio) | | | | |
|---|---|---|---|---|---|---|---|---|---|---|
| | | | | | | Calcite CaCO₃ | Dolomite CaMg(CO₃)₂ | Sphalerite ZnS | Talc Mg₃Si₄O₁₀(OH)₂ | Diopside CaMgSi₂O₆ |
| Heat Exch.-In | >1.15 | 103.6 | 14.45 | 8.70 | 2.96 | 1.76 | 3.31 | 5.07 | 11.13 | 5.12 |
| Heat Exch.-Out | >1.15 | 69.6 | 14.45 | 8.90 | 2.96 | 1.55 | 2.78 | 6.11 | 10.07 | 4.01 |
| Return 9.5% of incoming CO₂ = 4.16 mmol/kg = NCA + 0.20 TA | | | | | | | | | | |
| Unflashed same as above | | | | | | | | | | |
| Gas Separator | 15.4 | 179.9 | 0.02 | 5.94 | 51.16 | 0.04 | 0.08 | 0.07 | −1.05 | −2.47 |
| HP Steam Sep. | 3.50 | 138.6 | 8.40 | 7.70 | 5.58 | 1.41 | 2.70 | 3.28 | 7.84 | 3.13 |
| LP Steam Sep. | 1.15 | 103.6 | 14.44 | 8.70 | 2.93 | 1.77 | 3.32 | 5.09 | 11.16 | 5.15 |
| Heat Exch.-In | >1.15 | 103.7 | 14.44 | 6.77 | 7.75 | 0.21 | 0.23 | 3.05 | 0.82 | −1.95 |
| Heat Exch.-Out | >1.15 | 69.7 | 14.44 | 6.67 | 7.75 | −0.28 | −0.90 | 3.73 | −2.07 | −4.27 |
| Add 16.0% of incoming CO₂ = 5.05 mmol/kg = NCA + 0.85 TA | | | | | | | | | | |
| Unflashed same as above | | | | | | | | | | |
| Gas Separator | 15.0 | 179.8 | 0.03 | 5.97 | 47.86 | 0.07 | 0.15 | 0.13 | −0.86 | −2.35 |
| HP Steam Sep. | 3.50 | 138.6 | 8.39 | 7.72 | 5.53 | 1.43 | 2.74 | 3.32 | 7.98 | 3.23 |
| LP Steam Sep. | 1.15 | 103.6 | 14.42 | 8.71 | 2.91 | 1.77 | 3.32 | 5.11 | 11.18 | 5.16 |
| Heat Exch.-In | >1.15 | 103.8 | 14.42 | 6.35 | 10.95 | −0.20 | −0.59 | 2.49 | −1.68 | −3.62 |
| Heat Exch.-Out | >1.15 | 69.8 | 14.42 | 6.24 | 10.95 | −0.71 | −1.74 | 3.13 | −4.62 | −5.98 |

The invention claimed is:

1. A method to control scale deposition in a geothermal power plant,
comprising
separating a gas-rich vapor containing carbon dioxide from a geothermal brine stream to produce geothermal brine with decreased gas content,
separating steam from the geothermal brine with decreased gas content to produce flashed geothermal brine,
providing said steam to a steam turbine,
providing said flashed geothermal brine to a binary heat exchanger, and
combining a predetermined portion of said gas-rich vapor with said flashed geothermal brine before said flashed geothermal brine exits said binary heat exchanger.

2. The method of claim 1, wherein
said gas-rich vapor contains at least 1.5 mole-percent carbon dioxide, and
at least a part of said gas-rich vapor is combined with said flashed geothermal brine before said flashed geothermal brine enters said binary heat exchanger, and
the moles of carbon dioxide added to said flashed geothermal brine at least equal the equivalents of noncarbonate alkalinity in said flashed geothermal brine.

3. The method of claim 2, wherein
said gas-rich vapor contains at least 7.5 mole-percent carbon dioxide, and
the moles of carbon dioxide added to said flashed geothermal brine at least equal the sum of equivalents of noncarbonate alkalinity plus one-fourth the total alkalinity in said flashed geothermal brine.

4. The method of claim 3, wherein said gas-rich vapor contains at least 25 mole-percent carbon dioxide.

5. The method of claim 3, wherein the moles of carbon dioxide added to said flashed geothermal brine do not exceed the sum of equivalents of noncarbonate alkalinity in said flashed geothermal brine plus equivalents of total alkalinity in said flashed geothermal brine.

6. The method of claim 1, wherein
said gas-rich vapor contains at least 1.5 mole-percent carbon dioxide, and
the amount of said gas-rich vapor combined with said flashed geothermal brine is sufficient to decrease the rate of scale deposition at the exit of said binary heat exchanger by at least 50%.

7. The method of claim 6, wherein
said gas-rich vapor contains at least 7.5 mole-percent carbon dioxide, and
the amount of said gas-rich vapor combined with said flashed geothermal brine is sufficient to decrease the rate of scale deposition at the exit of said binary heat exchanger by at least 75%.

8. The method of claim 1, wherein
said gas-rich vapor is partially condensed before it is combined with said flashed geothermal brine,
said gas-rich vapor contains at least 7.5 mole-percent carbon dioxide, and
the amount of said gas-rich vapor combined with said flashed geothermal brine is sufficient to decrease the rate of scale deposition at the exit of said binary heat exchanger by at least 50%.

9. The method of claim 8, wherein
at least a part of said gas-rich vapor is combined with said flashed geothermal brine before said geothermal brine enters said binary heat exchanger, and
said gas-rich vapor contains at least 25 mole-percent carbon dioxide.

10. The method of claim 9, wherein
said gas-rich vapor contains at least 50 mole-percent carbon dioxide, and
the amount of said gas-rich vapor combined with said flashed geothermal brine is sufficient to decrease the rate of scale deposition at the entrance of said binary heat exchanger by at least 75%.

11. The method of claim 1, wherein
said flashed geothermal brine is characterized by a pH value at the exit of said binary heat exchanger, and
said gas-rich vapor contains at least 1.5 mole-percent carbon dioxide, and sufficient gas-rich vapor is combined with said flashed geothermal brine to decrease said pH value by at least 0.5 unit.

12. The method of claim 11, wherein sufficient gas-rich vapor is combined with said flashed geothermal brine to decrease said pH value by at least 1.0 unit.

13. The method of claim 12, wherein sufficient gas-rich vapor is combined with said flashed geothermal brine to decrease said pH value by at least 1.5 unit.

14. In a geothermal power plant having at least one steam turbine, at least one main stage steam separator wherein geothermal brine is flashed, producing flashed geothermal brine and producing steam which is provided to the steam turbine, and at least one binary heat exchanger which receives said flashed geothermal brine from said main stage steam separators, an improvement comprising a gas separator which separates gas-rich vapor containing carbon dioxide from geothermal brine, and fluid conductive means for conducting said gas-rich vapor to at least one location where said gas-rich vapor is combined with said flashed geothermal brine, and at least one of said locations is before said flashed geothermal brine leaves said binary heat exchanger.

15. The geothermal power plant of claim 14 further comprising fluid conductive means disposed to convey geothermal brine from said gas separator to said main stage steam separator.

16. The geothermal power plant of claim 15, further comprising an auxiliary heat exchanger wherein said gas-rich vapor is partially condensed before being combined with said flashed geothermal brine.

17. In a geothermal power plant having at least one steam turbine, at least one main stage steam separator wherein geothermal brine is flashed, producing flashed geothermal brine and producing steam which is provided to the steam turbine, and at least one binary heat exchanger which receives said flashed geothermal brine from said main stage steam separators, an improvement comprising an auxiliary heat exchanger wherein a predetermined portion of said steam which has not passed through the steam turbine is partially condensed in the auxiliary heat exchanger, and a gas-rich vapor containing carbon dioxide exiting the auxiliary heat exchanger, and fluid conductive means for conducting said gas-rich vapor to at least one location where said gas-rich vapor is combined with said flashed geothermal brine, and at least one of said locations is before said flashed geothermal brine leaves said binary heat exchanger.

18. The geothermal power plant of claim 17, wherein at least one of said locations is between said main stage steam separator and said binary heat exchanger.

* * * * *